INVENTOR.
Vernon R. Isgren, Jr.

May 28, 1968     V. R. ISGREN, JR     3,385,412
OIL-COOLED FRICTION CLUTCH
Filed Jan. 9, 1967     2 Sheets-Sheet 2
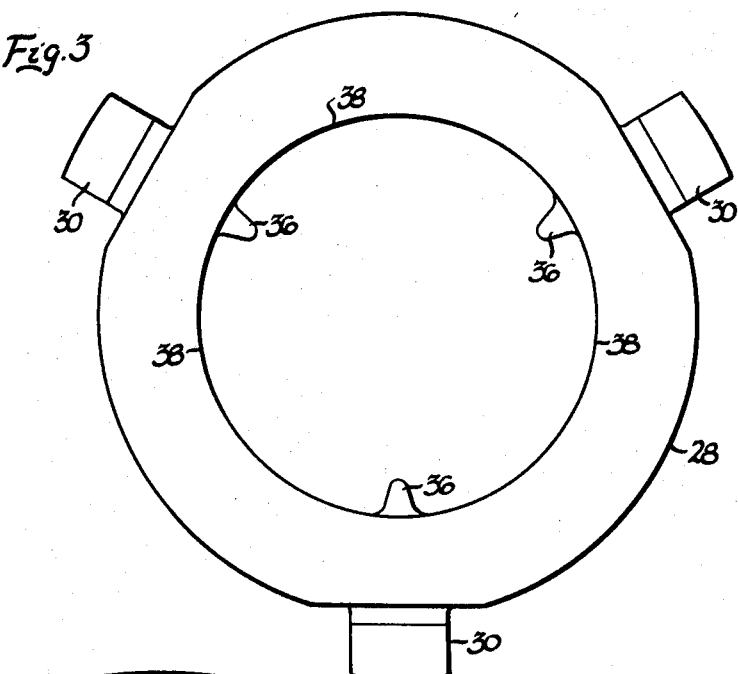
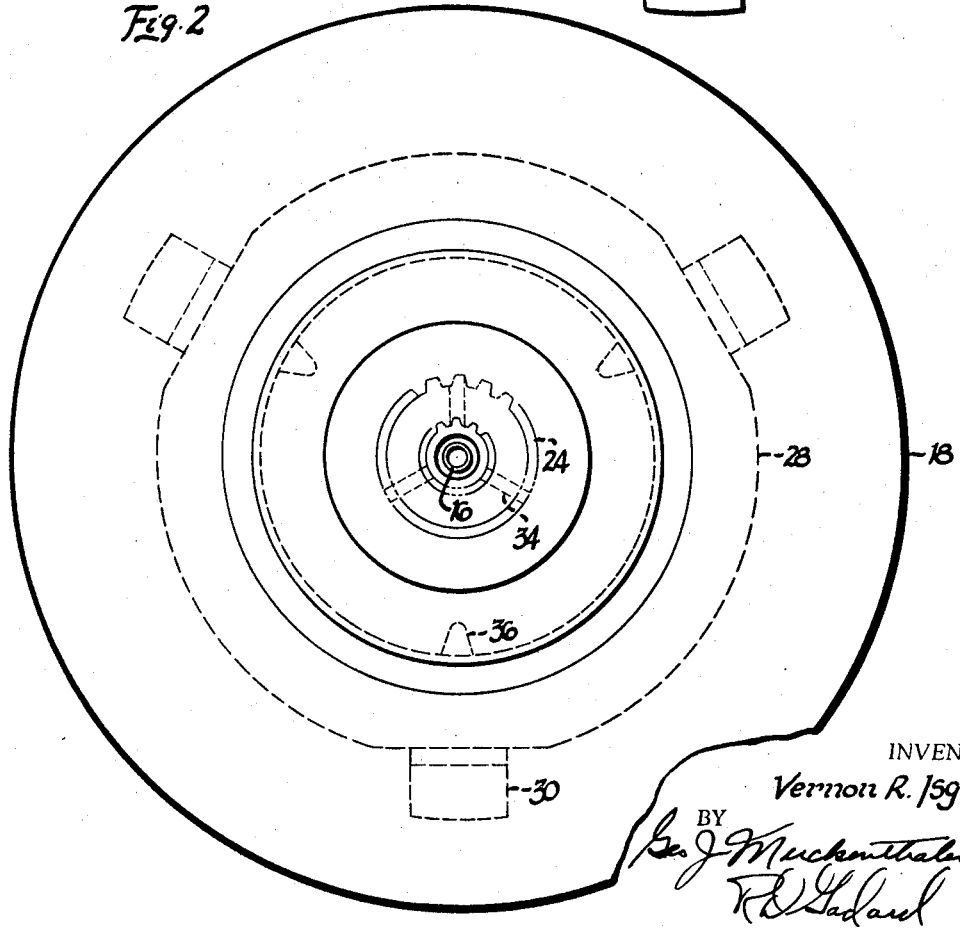
INVENTOR.
Vernon R. Isgren, Jr.

United States Patent Office 3,385,412
Patented May 28, 1968

3,385,412
OIL-COOLED FRICTION CLUTCH
Vernon R. Isgren, Jr., Racine, Wis., assignor to J. I. Case Company, Racine, Wis., a corporation of Wisconsin
Filed Jan. 9, 1967, Ser. No. 607,997
5 Claims. (Cl. 192—113)

ABSTRACT OF THE DISCLOSURE

A multiple disc friction clutch having means projecting radially inwardly from a friction disc carried by a flywheel which evenly distributes oil on the friction surfaces. Lubricating oil is discharged from a driven hub onto the projecting means.

---

This invention relates to clutches in a power transmission and more particularly to friction clutches of the fluid cooled type. The arrangement of the friction surfaces and the means for cooling these surfaces includes structure which breaks up the flow of fluid into a fine and uniform spray which spray of fluid is directed to the required areas.

Lubrication and cooling of transmission clutch plates has been accomplished by means of nozzles, baffles or grooves wherein the coolant is allowed to flow into only certain areas and consequently the friction surfaces are not uniformly cooled.

Oil-cooled clutches of the continuous slip type have been used in power transmissions of tractors and industrial vehicles and the main object of the present invention is to provide for improving the cooling action and frictional effect in these clutches.

Another object is to provide means cooperative with the friction surfaces for cooling said surfaces with a fluid spray at all times.

A further object is to provide means adjacent the friction surfaces for cooling said surfaces, which means are a part of the clutching mechanism.

Another object is to provide a divider means interposed between the friction surfaces and having portions for directing the cooling fluid uniformly.

Additional objects and advantages will become apparent from a reading of the following specification taken together with the annexed drawings, in which:

FIG. 2 is a view taken along the line 2—2 of FIG. 1;

FIG. 3 is a view of the dividing means including the fluid dispersing means.

Figure 1:
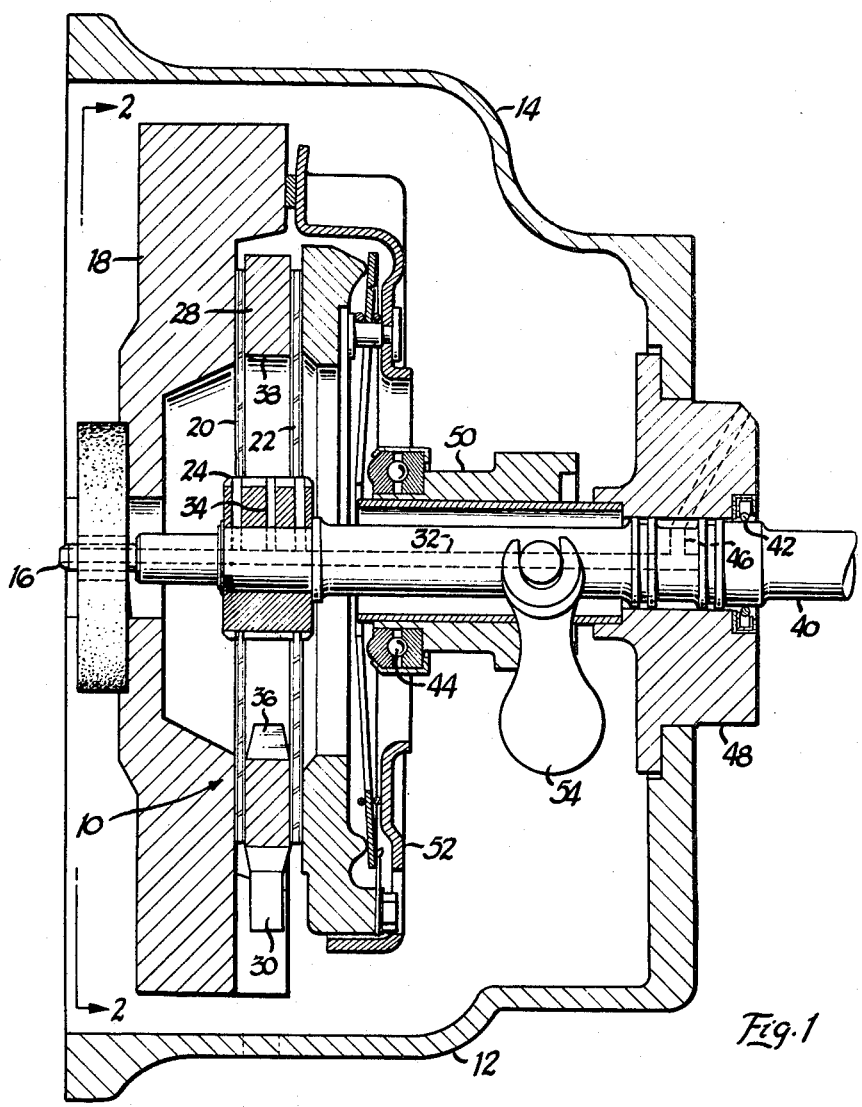
FIGURE 1 is a fragmentary, sectional view of a clutch mechanism showing the invention.

As seen in FIGS. 1 and 2, the invention is incorporated into a power transmission clutch assembly, generally designated as 10. Clutch assembly 10 is contained within a lower housing portion 12 and an upper housing portion 14. An engine or other prime mover (not shown) provides driving momentum to a crankshaft 16, which shaft carries a flywheel 18. Portions 12 and 14 also serve as a housing for flywheel 18. It is understood, of course, that when the engine is running, shaft 16 and flywheel 18 are turning as in the conventional drive train.

Figure 4:
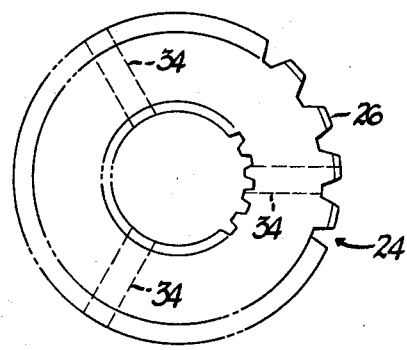
FIG. 4 is a view of the hub means showing the fluid flow passageways.

The clutch mechanism includes a pair of friction plates 20 and 22 carried on a clutch hub 24, which hub includes teeth 26, as shown in FIG. 4. Plates 20 and 22 also have teeth defined on the inner radius thereof to fit the teeth 26 of hub 24. A divider plate 28, shown in detail in FIG. 3, is interposed between friction plates 20 and 22 and includes drive lugs 30 equally spaced. Lugs 30 are connected with flywheel 18 such that divider plate 28 also turns when the engine is running. Flywheel 18 has slots into which are securely fitted lugs 30 for imparting the driving motion to plate 30.

As is well known, friction surfaces of roughened or abrasive material are used to connect and transmit the drive and of course these surfaces become heated to high temperatures. A cooling fluid must be applied to these surfaces to keep from burning the material.

In the present invention, cooling fluid such as oil is pumped through the clutch output shaft axial passageway 32 and ejected through holes or openings 34 in hub 24. Thus it is seen that there is a continuous supply of cooling oil available for cooling the friction surfaces of the clutch assembly, even though the clutch output shaft has stopped turning. As stated, the divider plate turns with the flywheel and the pressurized oil is forced through the shaft and the openings in hub 24.

Divider plate 28 includes internal protrusions, spurs or lugs 36 and curved portions 38, the lugs being equally spaced around the divider plate for even distribution of the cooling oil which is pumped through the shaft and through passageways 34. Since the divider plate is turning at all times that the engine is running, by reason of the drive lugs 30 being connected to the flywheel, the fluid is ejected radially through the openings 34 at three locations and the radial streams of oil take on the characteristics of an oil spray. The streams of oil strike the internal protrusions 36 as the plate 28 is turning and the resulting oil spray aids in cooling the clutch at all times.

In operation, the yoke 54 is actuated such that the friction plates are moved fore-and-aft on hub 24 by means of the pressure plate assembly. Since oil is being continually forced through openings 34, the central set of openings direct the oil between plates 20 and 22 onto lugs 36 which changes the stream of oil into a spray. It is to be noted that the openings 34 which are on the right and left in FIG. 1, are positioned such that the friction plates overlap the openings. Oil being ejected through these openings is forced along frictional surfaces which surfaces are distal from divider plate 28. As the friction plates are moved toward the divider, the oil spray is directed between the surfaces for lubrication and cooling. As the plates are moved away from the divider, the oil spray cools the heated surfaces. When full power is on the flywheel and divider plate but the clutch mechanism is continuously slipped as in reduced ground speeds, it is essential that the oil spray be directed into the minute spaces between the friction surfaces and the divider plate.

Oil is pumped by conventional means along the axial passageway 32 in a clutch output shaft portion 40 which is carried in suitable bearings. An oil seal 42 is provided such that cooling oil cannot escape and therefore the oil travels from inlet port 46 along passageway 32 to hub 24. A throwout bearing 44 is provided adjacent the clutch mechanism. An output shaft carrier 48 and a clutch throwout carrier 50 are parts which are not necessary to further explain. The clutch structure also includes a pressure plate assembly 52 and a throwout yoke 54, the yoke being connected to actuating means which is not shown.

As the divider plate 28 continually turns by reason of connection to the flywheel, the oil pumped along passageway 32 and through openings 34 is directed to the lugs 36 and onto the frictional surfaces. As seen in FIG. 2, clutch hub 24 has three openings aligned fore-and-aft with the shaft and also has openings at 120° apart so that the oil is forced through nine openings in the hub. The centrally positioned openings, shown in FIG. 2, direct the oil to the lugs 36 at all times and the openings which are nearly axially aligned with the frictional clutch plates direct the oil to the outer surfaces. Thus it is seen that lugs 36 disperse the fluid on the inner frictional surfaces at all times. When the clutch is slipped, the output shaft rotates at a lower r.p.m. than the flywheel, but since the flywheel drives the divider plate, the oil being supplied through openings 34 strikes the lugs 36 such that the frictional surfaces are always supplied with cooling.

The oil spray is being directed onto the friction surfaces at all times when the clutch is being engaged and disengaged and especially at those times when the clutch is being slipped as when there is neither total engagement nor disengagement. In a clutch capable of continuous slip wherein the engine is running at full speed, it is necessary at times to move the vehicle at lower ground speeds, and this is where the cooling is especially important. The structure of the present invention provides an efficient means for cooling the friction surfaces and extended periods of operation under the continuous slip condition are thus possible.

While the invention provides what may be termed a simple structure to obtain the desired jet spray of cooling oil for the friction surfaces, it is a great improvement over prior devices for this purpose.

The above described device is a means for accomplishing all the objects and advantages of improved cooling for clutches efficiently and economically. Variations on the above description may occur to those skilled in the art and it is to be understood that all such variations are contemplated as within the scope of the invention. The invention is not intended to be taken as limited by the embodiment disclosed, nor in fact, in any manner except as defined in the following claims.

What is new and desired to be secured by Letters Patent of the United States is:

1. An oil-cooled friction clutch for use in a vehicle having an engine, a flywheel driven by the engine and an output shaft connected to said clutch, including an axial passageway lengthwise of said shaft, a pair of friction elements on said shaft disposed so as to be engaged and disengaged, dividing means carried on said flywheel and positioned between the friction elements to be rotated by said flywheel, an oil supply flowing through said passageway for cooling said friction elements, and projecting means on the radially inner edge of said dividing means for distributing the flow of oil evenly on said friction elements.

2. A friction clutch in accordance with claim 1 wherein the dividing means is an annular member interposed between said friction elements.

3. A friction clutch in accordance with claim 1 including a hub on said shaft and having a plurality of passageways for the flow of oil from the axial passageway of said shaft to the friction elements.

4. A friction clutch in accordance with claim 2 wherein the member includes a plurality of curved portions spaced for evenly distributing the flow of oil.

5. A friction clutch in accordance with claim 4 wherein said curved portions are spaced along said dividing means for dispersing the flow of oil into a spray pattern.

References Cited

UNITED STATES PATENTS

| | | | |
|---|---|---|---|
| 2,879,872 | 3/1959 | Ranst | 192—113.2 X |
| 3,025,686 | 3/1962 | Lewis | 192—113.2 X |
| 3,249,189 | 5/1966 | Schjolin et al. | 192—113.2 X |
| 3,351,169 | 11/1967 | McIndoe | 192—113.2 X |

BENJAMIN W. WYCHE III, *Primary Examiner.*